United States Patent
Jo et al.

(10) Patent No.: US 9,645,169 B2
(45) Date of Patent: May 9, 2017

(54) MEASUREMENT APPARATUS AND METHOD WITH ADAPTIVE SCAN RATE

(71) Applicant: Park Systems Corp., Suwon-si, Gyeonggi-do (KR)

(72) Inventors: Ah Jin Jo, Seoul (KR); Ju Suk Lee, Suwon-si (KR); Yong Sung Cho, Suwon-si (KR); Sang Han Chung, Seoul (KR); Sang-il Park, Seongnam-si (KR)

(73) Assignee: PARK SYSTEMS CORPORATION, Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/841,650

(22) Filed: Aug. 31, 2015

(65) Prior Publication Data
US 2016/0356808 A1     Dec. 8, 2016

(30) Foreign Application Priority Data

Jun. 2, 2015  (KR) .......................... 10-2015-0078223

(51) Int. Cl.
*G01Q 10/04* (2010.01)
*G01Q 30/06* (2010.01)
*G01Q 10/06* (2010.01)

(52) U.S. Cl.
CPC ............. *G01Q 30/06* (2013.01); *G01Q 10/06* (2013.01); *G01Q 10/04* (2013.01); *G01Q 10/065* (2013.01)

(58) Field of Classification Search
CPC ...... G01Q 10/00; G01Q 10/045; G01Q 10/06; G01Q 60/24; G01Q 10/04; G01Q 30/06; G01Q 10/065
See application file for complete search history.

(56) References Cited

U.S. PATENT DOCUMENTS 4,954,704 A * 9/1990 Elings .................... B82Y 35/00
                                                        250/306
5,204,531 A * 4/1993 Elings .................... B82Y 35/00
                                                        250/307

(Continued)

FOREIGN PATENT DOCUMENTS

| JP | 02-265155 A | 10/1990 |
| JP | 2000263850 A | 9/2000 |
| JP | 2013255850 A | 12/2013 |

OTHER PUBLICATIONS

Schitter, G., F. Allgöwer, and A. Stemmer. "A new control strategy for high-speed atomic force microscopy." Nanotechnology 15.1 (2003): 108.*

(Continued)

*Primary Examiner* — Wyatt Stoffa
(74) *Attorney, Agent, or Firm* — Hauptman Ham, LLP

(57) ABSTRACT

A measurement method in which a sensing unit acquires surface data of a measurement target while scanning the surface of the measurement target and at least one of the sensing unit and the measurement target is moved in order for the sensing unit to scan the surface along a plurality of fast scan lines on the surface of the measurement target, includes: a first step in which the sensing unit scans a surface along any one fast scan line of the plurality of fast scan lines to acquire the surface data along the any one fast scan line; and a second step in which the sensing unit acquires a surface data along a fast scan line most adjacent to the any one fast scan line while at least one of the sensing unit and the measurement target is moved along the most adjacent fast scan line, after the first step.

18 Claims, 14 Drawing Sheets

(56) References Cited

U.S. PATENT DOCUMENTS

| | | | | |
|---|---|---|---|---|
| 7,472,585 B2* | 1/2009 | Abramovitch | ......... | B82Y 35/00 250/307 |
| 7,513,142 B2* | 4/2009 | Rice | ............ | B82Y 35/00 73/105 |
| 7,703,314 B2* | 4/2010 | Abe | ............ | B82Y 35/00 73/105 |
| 9,057,740 B1* | 6/2015 | Ukraintsev | ............ | G01Q 10/06 |
| 2001/0032496 A1* | 10/2001 | Watanabe | ............ | B82Y 35/00 73/105 |
| 2002/0079446 A1* | 6/2002 | Miyatani | ............ | B82Y 35/00 250/306 |
| 2007/0176101 A1* | 8/2007 | Proksch | ............ | G01Q 10/06 250/307 |
| 2008/0277582 A1* | 11/2008 | Shi | ............ | B82Y 35/00 250/309 |
| 2009/0107222 A1* | 4/2009 | Abramovitch | ......... | B82Y 35/00 73/105 |
| 2014/0380531 A1* | 12/2014 | Ukraintsev | ............ | G01Q 30/04 850/3 |
| 2015/0026846 A1* | 1/2015 | Proksch | ............ | G01Q 10/00 850/1 |
| 2015/0168444 A1* | 6/2015 | Ukraintsev | ............ | G01Q 10/06 850/3 |
| 2015/0198630 A1* | 7/2015 | Shi | ............ | B82Y 35/00 850/3 |

OTHER PUBLICATIONS

Ahmad, Ahmad, Andreas Schuh, and Ivo W. Rangelow. "Adaptive AFM scan speed control for high aspect ratio fast structure tracking." Review of Scientific Instruments 85.10 (2014): 103706.*

R. S. Robinson et al., "A digital integrator and scan generator coupled with dynamic scanning for scanning tunneling microscopy", Review of Scientific Instrument, Jul. 1991, pp. 1772-1775, vol. 62, No. 7, American Institute of Physics.

P. Heuell et al., "An adaptive scan generator for a scanning tunneling microscope", Review of Scientific Instrument, Jan. 1994, pp. 89-92, vol. 65, No. 1, American Institute of Physics.

J. Scheuring et al., "Self-optimizing and adaptive digital signal processor based algorithms in scanning tunneling microscopy", Review of Scientific Instrument, Dec. 1998, pp. 4191-4194, vol. 69, No. 12, American Institute of Physics.

Dean Dawson et al., "In-Line Monitoring of Shallow Trench Isolation Etch Depth", Veeco, Feb. 3, 2006, pp. 1-4, Veeco Instruments Inc.

MultiMode SPM Instruction Manual, 2006, pp. 1-260, Veeco Instruments Inc.

Yudong Zhang et al., "Note: A novel atomic force microscope fast imaging approach: Variable-speed scanning," Review of Scientific Instruments 82. 056103 (2011), published online May 20, 2011, 2011 American Institute of Physics, 5 pages.

* cited by examiner

LINE PROFILE ALONG DOTTED LINE

MEASUREMENT APPARATUS AND METHOD WITH ADAPTIVE SCAN RATE

CROSS-REFERENCE TO RELATED APPLICATIONS

This application claims the priority of Korean Patent Application No. 2015-0078223 filed on Jun. 2, 2015, in the Korean Intellectual Property Office, the disclosure of which is incorporated herein by reference.

BACKGROUND

Technical Field

The present disclosure relates to a measurement apparatus and a measurement method with an adaptive scan rate, and more particularly, to a measurement apparatus and a measurement method capable of increasing a measurement speed by variably applying a scan rate by using data about an at least immediately previously measured fast scan line.

Description of the Related Art

A Scanning Probe Microscope (SPM) refers to a microscope configured to measure surface characteristics of a sample while scanning a probe manufactured by an MEMS process over a surface of the sample, and show the surface characteristics of the sample in a 3D image. The SPM can be subdivided into an Atomic Force Microscope (AFM), a Scanning Tunneling Microscope (STM), and the like depending on a measurement method.

FIG. 1 is a schematic perspective view of an atomic force microscope of the prior art in which an XY-scanner is separated from a Z-scanner.

Referring to FIG. 1, an atomic force microscope 10 includes a cantilever 2 configured to follow a surface of a measurement target 1 in a contact or non-contact state, an XY-scanner 11 configured to scan the measurement target on an XY-plane in an X direction and a Y-direction, a Z-scanner 21 connected with the cantilever 2 and configured to move the cantilever 2 in a Z-direction with a relatively small displacement, a Z-stage 12 configured to move the cantilever 2 and the Z-scanner 21 in the Z-direction with a relatively large displacement, and a frame 13 configured to fix the XY-scanner 11 and the Z-stage 12.

The atomic force microscope 10 obtains an image such as a topographic image by scanning a surface of the measurement target 1 with the cantilever 2. A relative movement between the surface of the measurement target 1 and the cantilever 2 can be carried out by the XY-scanner 11, and a vertical movement of the cantilever 2 along the surface of the measurement target 1 can be carried out by the Z-scanner 21. Meanwhile, the cantilever 2 is connected with the Z-scanner 21 through a probe arm 22.

A scanning probe microscope like the atomic force microscope 10 needs to physically scan the entire surface of the measurement target 1 with the cantilever 2. As a scan rate is increased, it is difficult for the Z-scanner 21 to maintain proper feedback. Thus, an image quality may deteriorate. In particular, if the surface of the measurement target 1 has a high step-height, it is difficult to obtain feedback of the cantilever. Thus, it is inevitable to lower the scan rate. That is, an image quality and a scan rate are not easily compatible with each other in the scanning probe microscope as a scanning-based apparatus. Accordingly, a low image throughput has been an obstacle to widen application of the scanning probe microscope in the industrial world.

SUMMARY

The present disclosure has been conceived to solve the above-described problem. An object of the present disclosure is to provide a measurement apparatus and a measurement method capable of increasing measurement speed by variably applying a scan rate with data about an at least immediately previously measured fast scan line.

However, the objects of the present disclosure are not limited to the above-described ones. Although not described herein, other objects can be clearly understood by those skilled in the art from the following descriptions.

According to an aspect of the present disclosure to achieve the above-described object, there is provided a measurement method in which a sensing unit acquires surface data of a measurement target while scanning the surface of the measurement target. At least one of the sensing unit and the measurement target is moved in order for the sensing unit to scan the surface along a plurality of fast scan lines on the surface of the measurement target. The measurement method includes: a first step in which the sensing unit scans a surface along any one fast scan line of the plurality of fast scan lines to acquire the surface data along the any one fast scan line; and a second step in which the sensing unit acquires a surface data along a fast scan line most adjacent to the any one fast scan line while at least one of the sensing unit and the measurement target is moved along the most adjacent fast scan line, after the first step. A scan rate in the second step is determined by using at least the surface data acquired in the first step.

According to another feature of the present disclosure, the sensing unit is a cantilever including a tip.

According to yet another feature of the present disclosure, in the second step, the scan rate is determined by using a variation per scan distance in the surface data along the any one fast scan line.

According to still another feature of the present disclosure, the surface data is a topography data about the surface.

According to still another feature of the present disclosure, the scan rate in the second step is set to decrease from a predetermined time before measurement of a point corresponding to a point at which the variation acquired in the first step is equal to or higher than a predetermined value.

According to still another feature of the present disclosure, the scan rate in the second step is set to increase from a predetermined time after measurement of a point corresponding to a point at which the variation acquired in the first step is equal to or lower than a predetermined value.

According to still another feature of the present disclosure, the method for determining the scan rate in the second step includes: acquiring a variation value in the surface data acquired in the first step; acquiring an absolute value of the variation value; smoothing the absolutized variation value; and converting the value acquired by the smoothing into a scan rate.

According to still another feature of the present disclosure, the method for determining the scan rate in the second step includes: acquiring a variation value in the surface data acquired in the first step; acquiring an absolute value of the variation value; smoothing the absolutized variation value; clipping the value acquired by the smoothing; and converting the value acquired by the clipping into a scan rate.

According to still another feature of the present disclosure, the method for determining the scan rate in the second step includes: acquiring a variation value in the surface data acquired in the first step; acquiring an absolute value of the variation value; clipping the absolutized variation value; smoothing the value acquired by the clipping; and converting the value acquired by the smoothing into a scan rate.

According to still another feature of the present disclosure, the method for determining the scan rate in the second step includes: smoothing the surface data acquired in the first step; and converting the value acquired by the smoothing into a scan rate.

According to still another feature of the present disclosure, the method for determining the scan rate in the second step includes: smoothing the surface data acquired in the first step; clipping the value acquired by the smoothing; and converting the value acquired by the clipping into a scan rate.

According to still another feature of the present disclosure, the method for determining the scan rate in the second step includes: clipping the surface data acquired in the first step; smoothing the value acquired by the clipping; and converting the value acquired by the smoothing into a scan rate.

According to still another feature of the present disclosure, the smoothing is performed by using a low-pass filtering technique.

According to another aspect of the present disclosure, there is provided a measurement apparatus in which a sensing unit scans a surface of a measurement target and acquires a surface data. The measurement apparatus includes: an XY-scanner configured to generate a relative movement between the measurement target and the sensing unit in an XY-direction; a Z-scanner configured to generate a relative movement between the measurement target and the sensing unit in a Z-direction; and a control device configured to control driving of the XY-scanner and the Z-scanner. The surface data are acquired by integrating M number of fast scan lines on the surface (herein, M is an integer of 2 or more). The control device determines a scan rate for an Nth fast scan line (herein, N is an integer satisfying 1<N≤M) by using surface data of at least N−1th measured fast scan line, and drives the XY-scanner accordingly.

According to another feature of the present disclosure, the XY-scanner and the Z-scanner are formed into one body.

According to yet another feature of the present disclosure, the measurement apparatus is an atomic force microscope.

According to the measurement method and the measurement apparatus of the present disclosure, it is possible to provide a high-quality image of a surface of a measurement target while increasing a measurement speed. Accordingly, a high throughput can be expected.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
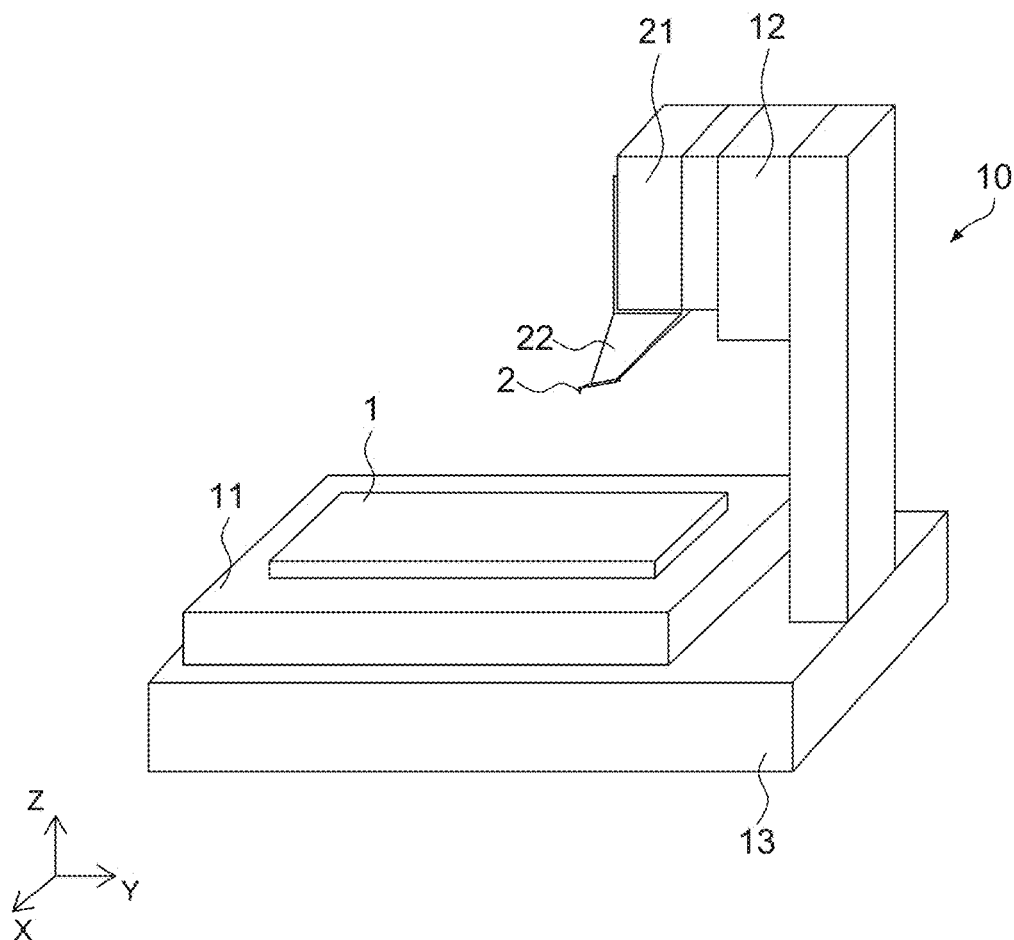
FIG. 1 is a schematic perspective view of an atomic force microscope of the prior art in which an XY-scanner is separated from a Z-scanner.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide those skilled in the art to which the present disclosure pertains with the category of the invention, and the present disclosure will be defined by the appended claims.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by those skilled in the art, and the embodiments can be carried out independently of or in association with each other.

Image Acquiring Method by Apparatus and Scanning

In the present specification, the description for the present disclosure will be based on an atomic force microscope, but does not intend to limit the present disclosure to the atomic force microscope for realizing a measurement method. The present method can also be used in other measurement apparatuses configured to acquire surface data of a measurement target by physical scanning. For example, the present method can be widely used in a scanning probe microscope.

Figure 2:
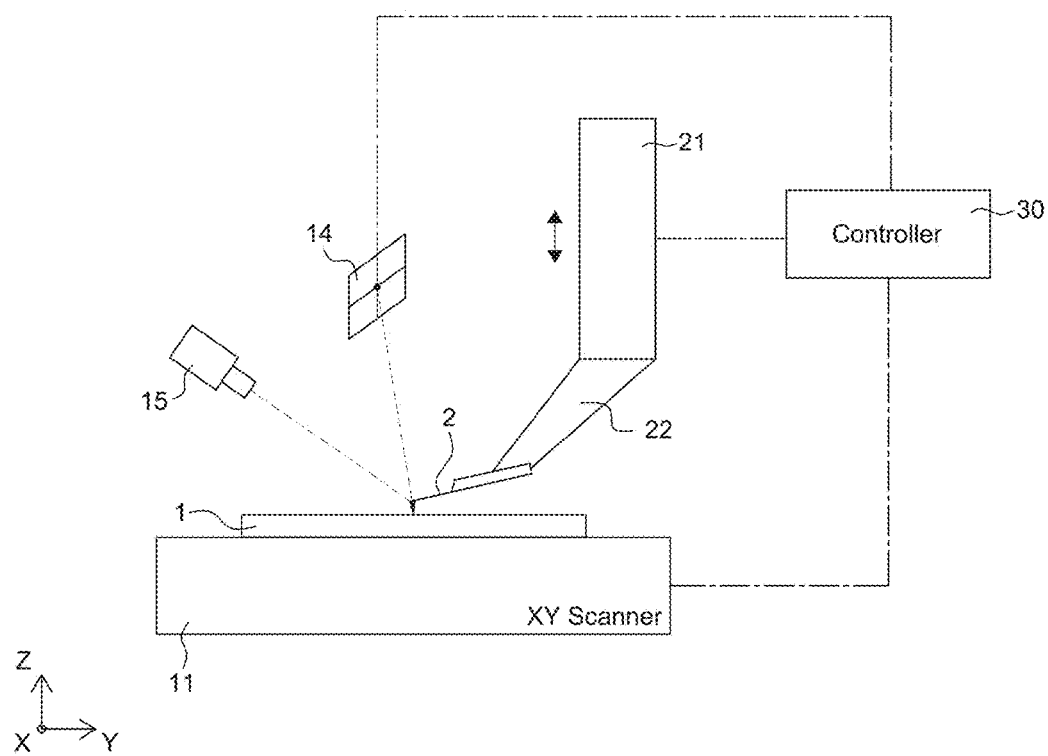
FIG. 2 is a schematic conceptual diagram illustrating a configuration of an atomic force microscope to which a measurement method according to the present disclosure can be applied.
Figure 3A:
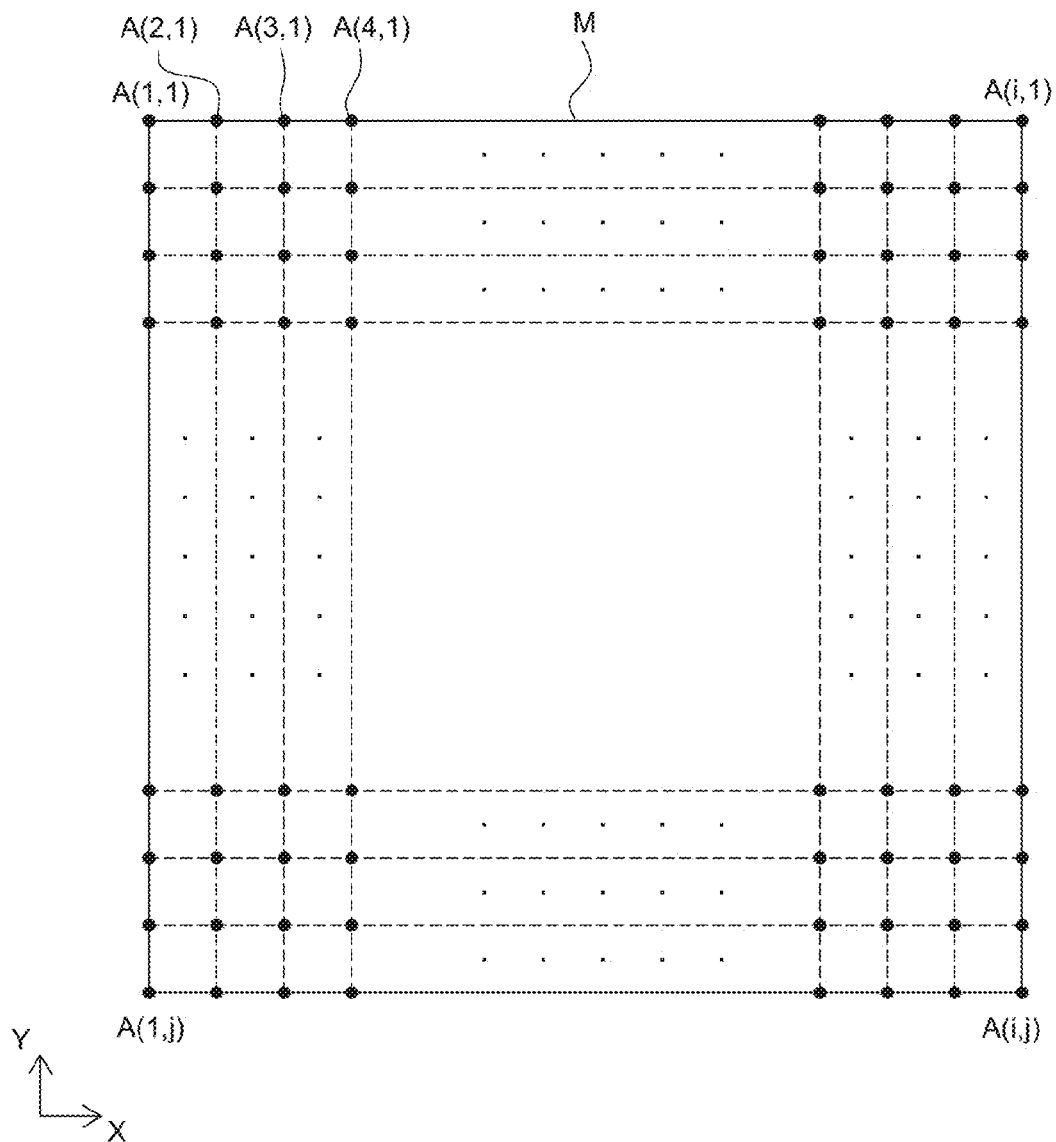
FIG. 3A is a map of data acquisition points on a surface of a measurement target and FIG. 3B illustrates a scan path on the surface of the measurement target.
Figure 3B:
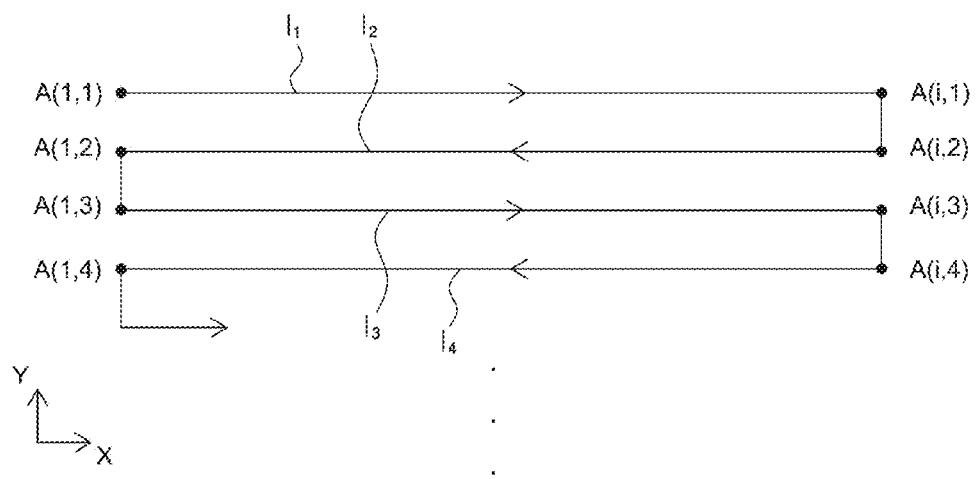

FIG. 2 is a schematic conceptual diagram illustrating a configuration of an atomic force microscope to which a measurement method according to the present disclosure can be applied, and FIG. 3A is a map of data acquisition points on a surface of a measurement target and FIG. 3B illustrates a scan path on the surface of the measurement target.

Referring to FIG. 2, the atomic force microscope includes an XY-scanner 11, a Z-scanner 21, and a controller 30. As for the other components, the configuration of the atomic force microscope 10 illustrated in FIG. 1 may be referred to.

The XY-scanner 11 is configured to support a measurement target 1 and scan the measurement target 1 in an XY-direction. The XY-scanner 11 may be driven by, for example, a piezoelectric actuator. In the case where the XY-scanner 11 is separated from the Z-scanner 21 as shown in the present exemplary embodiment, a stacked piezoelectric actuator may be used. As for the XY-scanner 11, Korean Patent Nos. 10-0523031 (entitled "XY-scanner in scanning probe microscope and method of driving the same") and 10-1468061 (entitled "Control method of scanner and scanner device using thereof") registered under the name of the present applicant may be referred to.

The Z-scanner 21 is connected with a cantilever 2 including a tip and configured to adjust a height of the cantilever 2. Like the XY-scanner 11, the Z-scanner 21 may also be driven by a piezoelectric actuator. As for the Z-scanner 21, Korean Patent Nos. 10-1476808 (entitled "Scanner apparatus and atomic force microscope including the same") registered under the name of the present applicant may be referred to.

The XY-scanner 11 and the Z-scanner 21 may be present as being separated from each other, as illustrated in FIG. 1 and FIG. 2, or may be present as being integrated as one member by a tube piezoelectric actuator. The tube piezoelectric actuator can perform an XY-direction movement together with a Z-direction movement, but the XY-direction movement may be coupled to the Z-direction movement, resulting in image distortion. However, in spite of such limitations, the present disclosure can be applied. Such an integrated XYZ-scanner is disclosed in U.S. Patent Laid-open Publication No. 2012-0079635A1 (entitled "Methods and devices for correcting errors in atomic force microscopy) and the like. Further, the other structures of the atomic force microscope known in the art may be used.

A laser generation unit 15 is configured to irradiate a laser beam (illustrated by a dotted line) to a surface of the cantilever 2, and a laser beam reflected from the surface of the cantilever 2 falls on a biaxial detector 14 such as a PSPD (Position Sensitive Photo Detector). A signal detected by the detector 14 is transmitted to the controller 30.

The controller 30 is connected with the XY-scanner 11 and the Z-scanner 21 and configured to control driving of the XY-scanner 11 and the Z-scanner 21. Further, the controller 30 converts the signal acquired from the detector into a digital signal with an ADC converter, and determines a degree of bending or distortion of the cantilever 2 by using the digital signal. A computer may be integrated into the controller 30, or a separate computer may be connected with the controller 30. The controller 30 may be placed in a rack as being integrated as one body, or may be present as being divided into two or more bodies.

The controller 30 transmits a signal for driving the XY-scanner 11 to scan the measurement target 1 in the XY-direction, and also controls the Z-scanner 21 such that the cantilever 2 has a uniform interactive force (that is, maintains a uniform degree of bending) with respect to the surface of the measurement target 1. That is, the controller 30 has closed-loop feedback logic in a software or electric circuit manner. Further, the controller 30 acquires topography surface data of the measurement target 1 by measuring a length of the Z-scanner 21 (or a length of the actuator used in the Z-scanner 21) or a voltage applied to the actuator used in the Z-scanner 21.

Herein, the tip of the cantilever 2 may be in a contact state (referred to as "contact mode") or in a non-contact state (referred to as "non-contact mode") with the surface of the measurement target 1, or may be in a state of tapping the surface of the measurement target 1 (referred to as "tapping mode"), which may be determined depending on a surface status of the measurement target 1, a condition of the cantilever 2, and a measurement condition. The scope of the present disclosure includes whichever mode is used.

Meanwhile, the surface data of the measurement target 1 acquired by the controller 30 may vary in addition to the topography data. For example, by performing a special process for magnetizing the cantilever 2 or applying an electrostatic force to the cantilever 2, the controller 30 may acquire data about a magnetic force or an electrostatic force on the surface of the measurement target 1. Modes of the atomic force microscope include MFM (Magnetic Force Microscopy), EFM (Electrostatic Force Microscopy), and the like, which may be realized by using a method known in the art. In addition, the surface data of the measurement target 1 may include a voltage on the surface, a current on the surface, and the like.

Referring to FIG. 3A, the controller 30 has mapping data about points at which the tip of the cantilever 2 acquires data. The controller 30 may have various mapping data that can be modified according to user's setting.

The user sets a measurement region M on the surface of the measurement target. For example, the user may give a command to the controller 30 to acquire data about a region of 10 μm×10 μm. The points for acquiring data are determined within the region set by the user. As the density of the points is increased, the resolution is increased. For example, the points may be variously set so as to acquire 256×256, 512×512, 512×1024 data within the specified region M. In order to acquire $i\lambda j$ data within the specified region M, as illustrated in FIG. 3A, the mapping data of $i\lambda j$ lattices may be selected.

The XY-scanner 11 scans the measurement target 1 such that the tip of the cantilever 2 is positioned at each of the points illustrated in FIG. 3A. As illustrated in FIG. 3B, the XY-scanner 11 may be driven to quickly scan a line in the X-direction, move down a space and then quickly scan a line in a negative X-direction, and then move down a space to scan a line. Herein, the X-direction (including the negative X-direction) may be referred to as a fast scan direction, and the Y-direction may be referred to as a slow scan direction. The fast scan direction may be the X-direction as illustrated in FIG. 3B, or may be the Y-direction, or may be any other direction which is not only perpendicular to the axis.

Lines along the fast scan direction may be referred to as fast scan lines, and the lines are illustrated as $l_1$, $l_2$, $l_3$, and $l_4$ in FIG. 3B. In the map as illustrated in FIG. 3A, a total number of j fast scan lines are present.

Meanwhile, the measurement target 1 may be measured by scanning one fast scan line back and forth in order of A(1, 1) to A(i, 1), to A(1, 1), to A(1, 2), to A(i, 2), to A(1, 2), to A(1, 3) . . . and so on to A(i, j).

If the XY-scanner 11 scans the surface of the measurement target 1 along the scan path as illustrated in FIG. 3B, the tip of the cantilever 2 follows the surface of the measurement target 1 by the Z-scanner 21, so that data, such as topography data, about the surface of the measurement target 1 are collected from each point (Aij: herein, i and j are integers of 1 or more). The controller 30 generates a three-dimensional image by using the collected data and offers the three-dimensional image to the user.

Theoretical Description of the Present Disclosure

Figure 4:
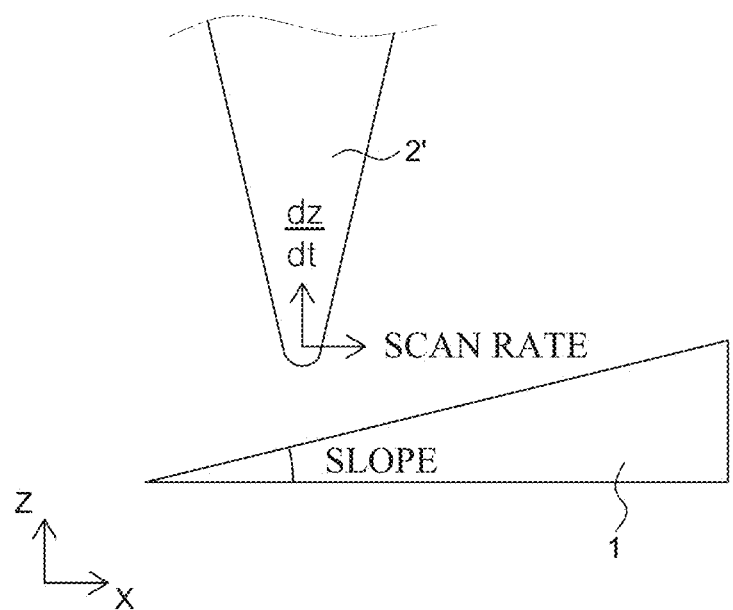
FIG. 4 is a conceptual diagram for describing a relationship between a scan rate and a slope of a measurement target.

FIG. 4 is a conceptual diagram for describing a relationship between a scan rate and a slope of a measurement target.

A Z-direction speed dz/dt of a tip 2' is defined as follows.

$$\frac{dz}{dt} = \frac{dz}{dx} \times \frac{dx}{dt} = \text{slope} \times \text{scanrate} \quad \text{(Equation 1)}$$

According to Equation 1, the Z-direction speed of the tip 2' can be defined as the product of a slope of the measurement target 1 and a scan rate in the X-direction. Meanwhile, since the tip 2' is moved in the Z-direction by closed-loop feedback control of the Z-scanner 21, dz/dt may also be defined as follows.

$$\frac{dz}{dt} = \text{Gain} \times \text{Error} \quad \text{(Equation 2)}$$

According to Equation 1 and Equation 2, Equation 3 is obtained.

$$\text{Error} = \frac{\text{slope} \times \text{scanrate}}{\text{Gain}} \quad \text{(Equation 3)}$$

According to Equation 3, as a slope of the measurement target 1 or a scan rate increases, an error value increases. That is, when the slope of the measurement target 1 is high, the scan rate needs to be lowered, so that the error value is not too high and thus the feedback control can be appropriately performed. On the contrary to this, when the slope of the measurement target 1 is low, even if the scan rate is increased, the feedback control can be appropriately performed. As a result, in order not to degrade an image quality by maintaining the error value in a predetermined range, it is necessary to appropriately adjust the scan rate depending on the slope of the measurement target 1.

Figure 5:
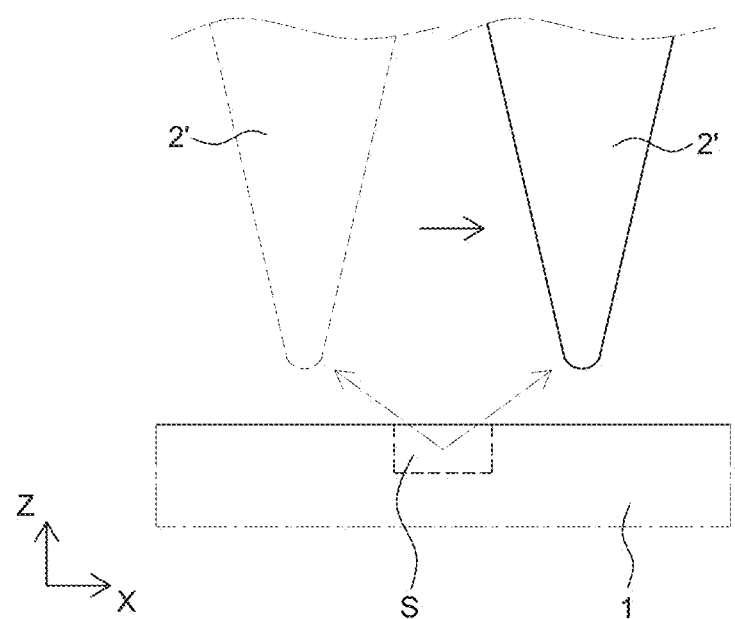
FIG. 5 is s schematic side view illustrating a tip for scanning a previous fast scan line, a tip for scanning an immediately subsequent fast scan line, and a surface of a measurement target.

FIG. 5 is s schematic side view illustrating a tip for scanning a previous fast scan line, a tip for scanning an immediately subsequent fast scan line, and a surface of a measurement target.

Referring to FIG. 5, the previous fast scan line is physically adjacent to the immediately subsequent fast scan line. Each of the tip (illustrated by a dotted line) for scanning the previous fast scan line and the tip (illustrated by a solid line) for scanning the immediately subsequent fast scan line is affected by Van der Waals interaction (and other forces such as a magnetic force, and an electrostatic force.) with respect to a partial region S of the measurement target 1. That is, surface data measured from the previous fast scan line have similar tendency with surface data measured from the immediately subsequent fast scan line. Therefore, the surface data from the immediately subsequent fast scan line are similar to the surface data measured from the previous fast scan line and can be predicted to some degree from the surface data measured from the previous fast scan line.

This is theoretically supported by the fact that the radius of a pointed portion of the tip 2' used in the atomic force microscope is about 5 to 20 nm, and if a 512×512 pixel image is acquired from a region of 5 μm×5 μm, a distance between the fast scan lines is about 10 nm.

Therefore, in theory, it is appropriate to determine a scan rate for the immediately subsequent fast scan line by using the previous fast scan line.

Measurement Method with Adaptive Scan Rate

Figure 6:
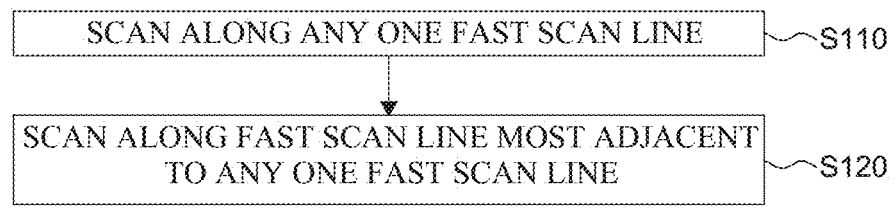
FIG. 6 is a flowchart illustrating a scanning method according to the present method.
Figure 7:
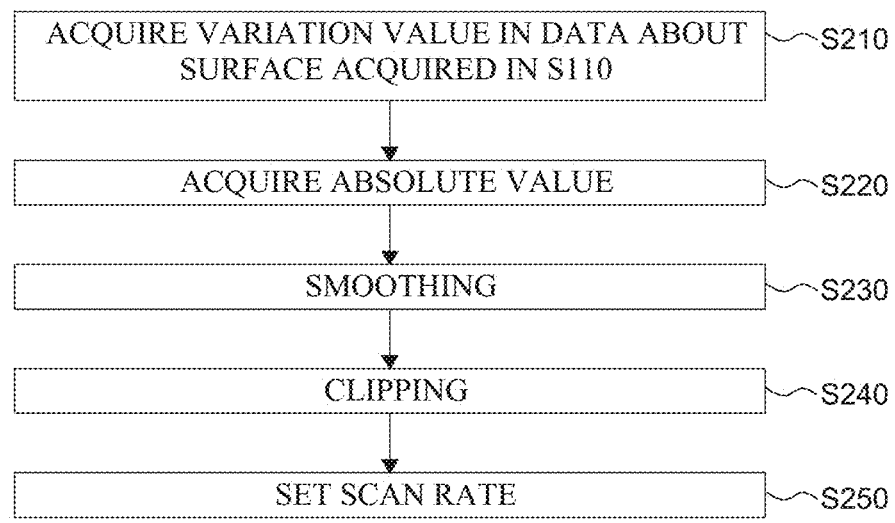
FIG. 7 is a flowchart illustrating a method for determining a scan rate in a second step in FIG. 6.
Figure 8:
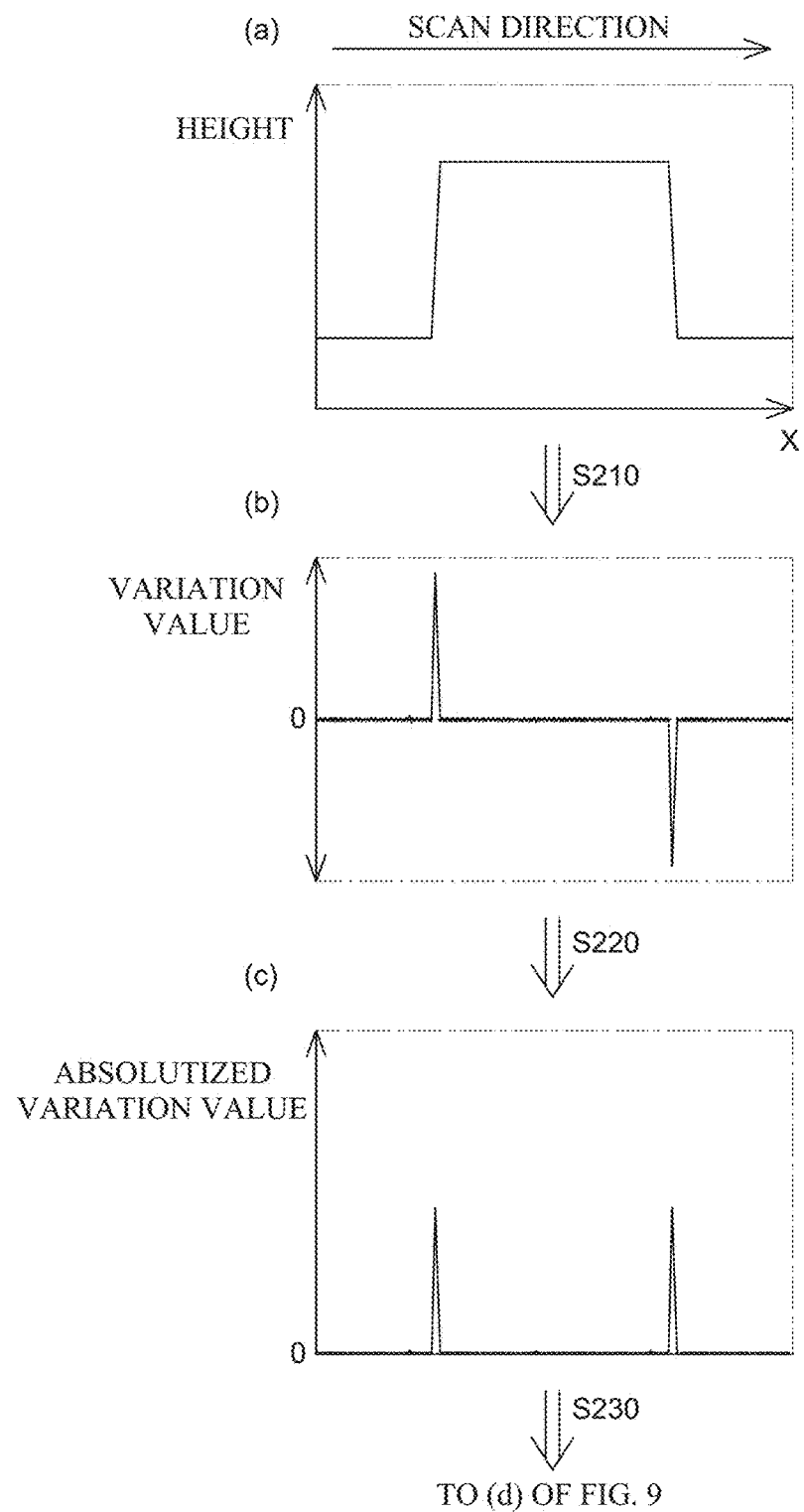
FIG. 8 and FIG. 9 show data acquired from the respective steps in FIG. 7.
Figure 9:
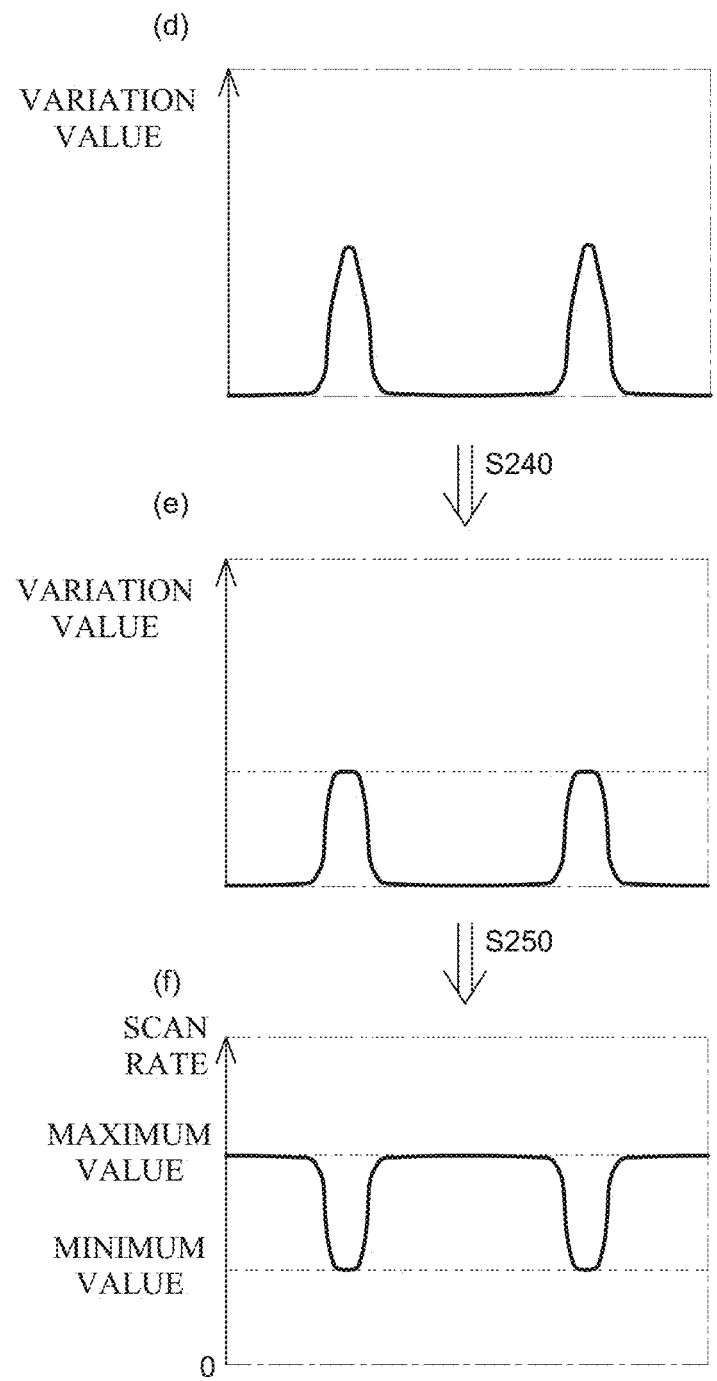

FIG. 6 is a flowchart illustrating a scanning method according to the present method, and FIG. 7 is a flowchart illustrating a method for determining a scan rate in a second step in FIG. 6. Further, FIG. 8 and FIG. 9 illustrate data acquired from the respective steps.

The measurement method according to an exemplary embodiment of the present disclosure is a method for measuring surface data of a measurement target while a sensing unit scans the surface of the measurement target. Herein, the sensing unit may be, for example, a tip. The measurement method according to the present disclosure may be used in a measurement apparatus such as a scanning probe microscope including an atomic force microscope. In the present specification, the atomic force microscope will be exemplified.

Meanwhile, the sensing unit is relatively moved along a plurality of virtual fast scan lines on the surface of the measurement target. As for the fast scan lines, FIG. 3A and FIG. 3B and the descriptions relevant thereto may be referred to. Herein, the sensing unit itself may be moved or the measurement target may be moved, or both of them may be moved. That is, the sensing unit just needs to be relatively moved along the surface of the measurement target, and a member to be actually moved may be determined depending on a method (for example, in the case of using a tube scanner, in the case of using an XY-scanner and a Z-scanner separated from each other, and the like).

Referring to FIG. 6, the measurement method according to an exemplary embodiment of the present disclosure includes: scanning a surface of a measurement target along any one of a plurality of fast scan lines (hereinafter, referred to as "first step", S110); and acquiring the surface data along a fast scan line most adjacent to the any one fast scan line while at least one of the sensing unit and the measurement target is moved along the most adjacent fast scan line (hereinafter, referred to as "second step", S120), after the first step.

In the first step, the any one fast scan line may be a fast scan line which is first fast-scanned ($l_1$ in FIG. 3B) or may be a certain fast scan line which is scanned later. Through the first step, the surface data along the any one fast scan line scanned are acquired. As for a method for acquiring the data, a known measurement method using an atomic force microscope may be referred to. The surface data may include topography data, EFM data, MFM data, voltage data, current data, and the like as described above.

After the first step, the sensing unit is relatively moved along a fast scan line most adjacent to the fast scan line scanned in the first step. For example, if $l_1$ in FIG. 3B is the fast scan line for the first step, the sensing unit is relatively moved along $l_2$ in the second step.

According to "Theoretical description of the present disclosure" described above, the adjacent fast scan lines are simultaneously affected by a force such as Van der Waals interaction from the same region. Therefore, the surface data along the immediately subsequent fast scan line can be predicted to some degree from the surface data along the previous fast scan line.

The present disclosure uses the surface data along an at least immediately previously scanned fast scan line in determining a scan rate for an immediately subsequent fast scan line, so that the scan rate can be optimized, thereby maximizing a measurement speed.

Referring to FIG. 7, the method for determining the scan rate in the second step includes: acquiring a variation value in the surface data acquired in the first step (S210); acquiring an absolute value of the variation value (S220); smoothing (S230); clipping (S240); and determining a scan rate (S250).

Hereinafter, the respective steps will be described in detail with reference to FIG. 8 and FIG. 9.

Firstly, a variation value in the surface data acquired in the first step is acquired (S210). Referring to (a) of FIG. 8, since any one fast scan line is scanned by the sensing unit in the first step, surface data of a measurement target on the any one fast scan line are acquired. Herein, for easy understanding, topography data will be exemplified as the surface data.

Herein, the variation value in the data may be a slope (for example, slope in Equation 3) of the data at each data acquisition point (point A in FIG. 3A), or may be an error signal (Error in Equation 2 and Equation 3) in the Z-direction measured at each data acquisition point by the detector (denoted by reference number 14 in FIG. 3) during the scanning in the first step. That is, the variation value in the present step (S210) may be calculated after the first step (S110) is performed, or may be acquired at the same time when the first step (S110) is completed. A time for acquiring the variation value just needs to be prior to the following step S220 or S230.

In the present step (S210), a variation value in the data is acquired as illustrated in (b) of FIG. 8. Referring to (b) of FIG. 8, a flat portion has a variation value close to 0, and a portion having a high step-height has a high variation value. To be specific, a portion in which a step-height increases in a scan direction has a positive variation value, and a portion in which a step-height decreases in the scan direction has a negative variation value.

The variation value in the data acquired in the step S210 is absolutized (S220). That is, a negative variation value is converted into a positive variation value. (c) of FIG. 8 illustrates absolute values of the variation values acquired in the present step (S220).

The absolute value acquired in the step S220 is smoothed (S230). The smoothing is also referred to as "smoothing process" and means a process for modifying a rapidly changed signal to be smoothly changed. Referring to (d) of FIG. 9, it can be seen that the data are smoothed so as to be smoothly changed.

Meanwhile, various existing methods may be introduced as a method for smoothing. For example, the smoothing may be realized by using a low-pass filtering technique.

The reason for performing the smoothing is that a rapid change in scan rate is neither necessary nor desirable. Further, this is to remove noise of a high frequency.

The value acquired in the step S230 is clipped (S240). To be specific, the data higher than a predetermined maximum value are adjusted to be equal to the maximum value or completely removed. Further, the data lower than a predetermined minimum value are adjusted to be equal to the minimum value or may be adjusted to a certain value. Herein, in the clipping step (S240), only one of the maximum value or the minimum value may be set.

For example, referring to (e) of FIG. 9, the values exceeding a predetermined maximum value (illustrated by a dotted line) are limited to be maximum values. If all of the absolute values are equal to or lower than the maximum value, the absolute values are intactly reflected in the subsequent step.

The reason for performing the clipping is that it is not necessary to reflect abnormally high or low data in a scan rate. Further, this is to set a maximum value and a minimum value of a scan rate. For example, if the clipping is not performed, a scan rate may be unnecessarily low or high.

Finally, a scan rate is calculated by using the data acquired in the step S240 (S250). The data acquired in the step S240 are obtained by absolutizing, smoothing, and clipping the variation value in the surface data along the previous fast scan line, and, thus, do not have a dimension of speed. Therefore, a process for converting the data into the dimension of scan rate is needed.

In (e) of FIG. 9, when the acquired value is high, the scan rate needs to be low, and when low, the scan rate needs to be high. That is, the value acquired in the step S240 needs to be in inverse proportion to the scan rate. Thus, preferably, an inverted scan rate graph may be produced as illustrated in (f) of FIG. 9. A formula for converting the value acquired in the step S240 can be variously set and may be set taking into account a maximum scan rate and a minimum scan rate for the corresponding measurement target.

Meanwhile, the order of the step S220 to the step S240 may be modified. For example, the step S230 may precede the step S220. Further, the step S240 may be omitted.

For example, the measurement method of the present disclosure may be performed by acquiring a variation value in the surface data acquired in the step S110 (S210), acquiring an absolute value of the variation value (S220), smoothing the absolutized variation value (S230), and converting the smoothed value into a scan rate (S250).

Further, the measurement method of the present disclosure may be performed by acquiring a variation value in the surface data acquired in the step S110 (S210), acquiring an absolute value of the variation value (S220), clipping the absolutized variation value (S240), smoothing the clipped value (S230), and converting the smoothed value into a scan rate (S250).

Figure 10:
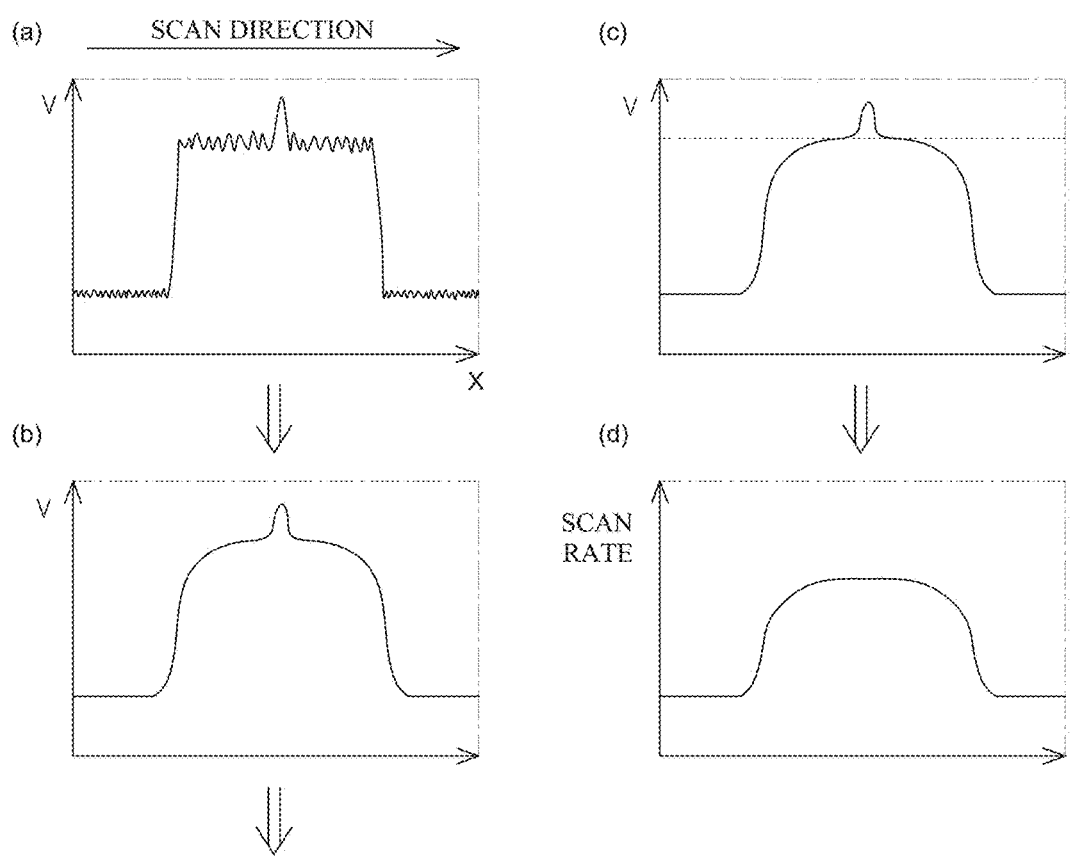
FIG. 10 illustrates data acquired from the respective steps of the method for determining a scan rate in the second step according to another exemplary embodiment.

FIG. 10 illustrates data acquired from the respective steps of the method for determining a scan rate in the second step according to another exemplary embodiment.

The method for determining the scan rate in the second step (S210) according to another exemplary embodiment includes smoothing the data acquired in the first step (S110) and converting the value acquired by the smoothing into a scan rate. Further, the present method may selectively include clipping after the smoothing.

The measurement method according to the present exemplary embodiment is different from the measurement method illustrated in FIG. 7 in that an absolute value of the data is not acquired and the surface data acquired in the first step (S110) are directly smoothed and clipped to obtain a scan rate in the second step (S120), but identical in details of the smoothing and clipping steps.

Referring to (a) of FIG. 10, surface data (surface voltage in the present exemplary embodiment) are acquired in the first step (S110). Then, the surface data are smoothed as illustrated in (b) of FIG. 10 and the smoothed data are clipped as illustrated in (c) of FIG. 10. Then, the clipped data are converted into a scan rate as illustrated in (d) of FIG. 10.

For example, the measurement method of the present disclosure may be performed by smoothing the surface data acquired in the step S110 and converting the smoothed value into a scan rate. Otherwise, the measurement method of the present disclosure may be performed by smoothing the surface data acquired in the step S110, clipping the smoothed value, and converting the clipped value into a scan rate. Alternatively, the measurement method of the present disclosure may be performed by clipping the surface data acquired in the step S110, smoothing the clipped value, and converting the smoothed value into a scan rate.

The present method is suitable for measurement of surface data in which a scan rate needs to be increased at a portion having a high value of, for example, a surface voltage (a portion which does not need to be precisely measured) and decreased at a portion having a low value (a portion which needs to be precisely measured). On the contrary to this, in conversion into a scan rate, the scan rate may be decreased at a portion having a low value and increased at a portion having a high value under some circumstances.

Actual Embodiment

Figure 11:
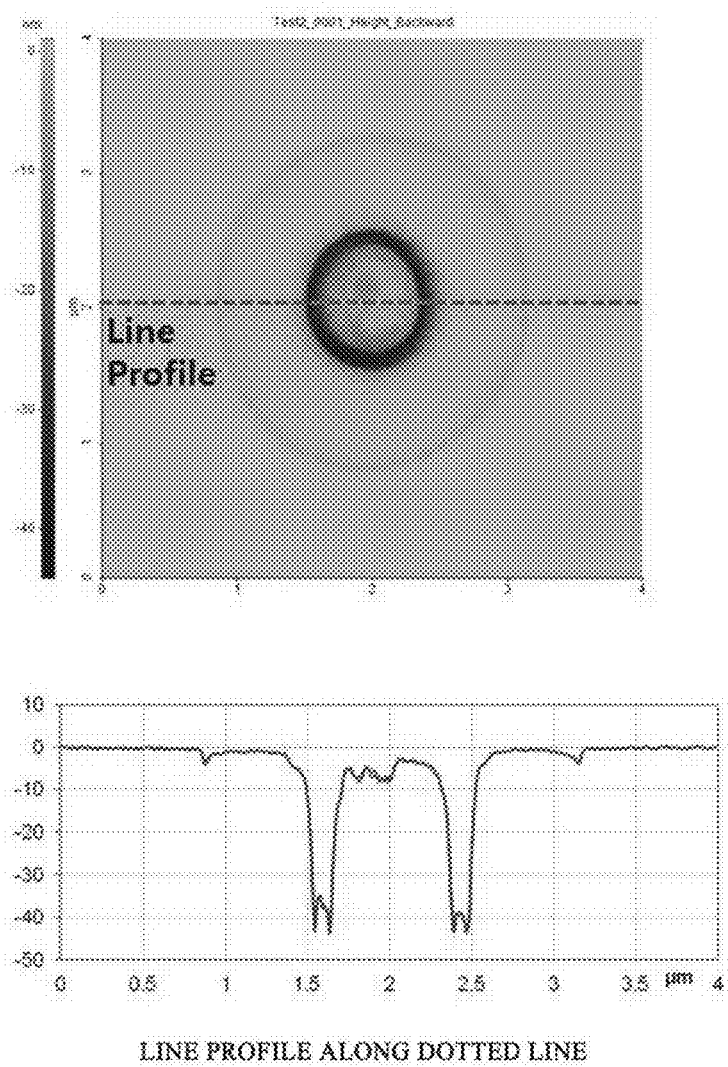
FIG. 11 illustrates a topographic image and a line profile of an exemplary measurement target.
Figure 12:
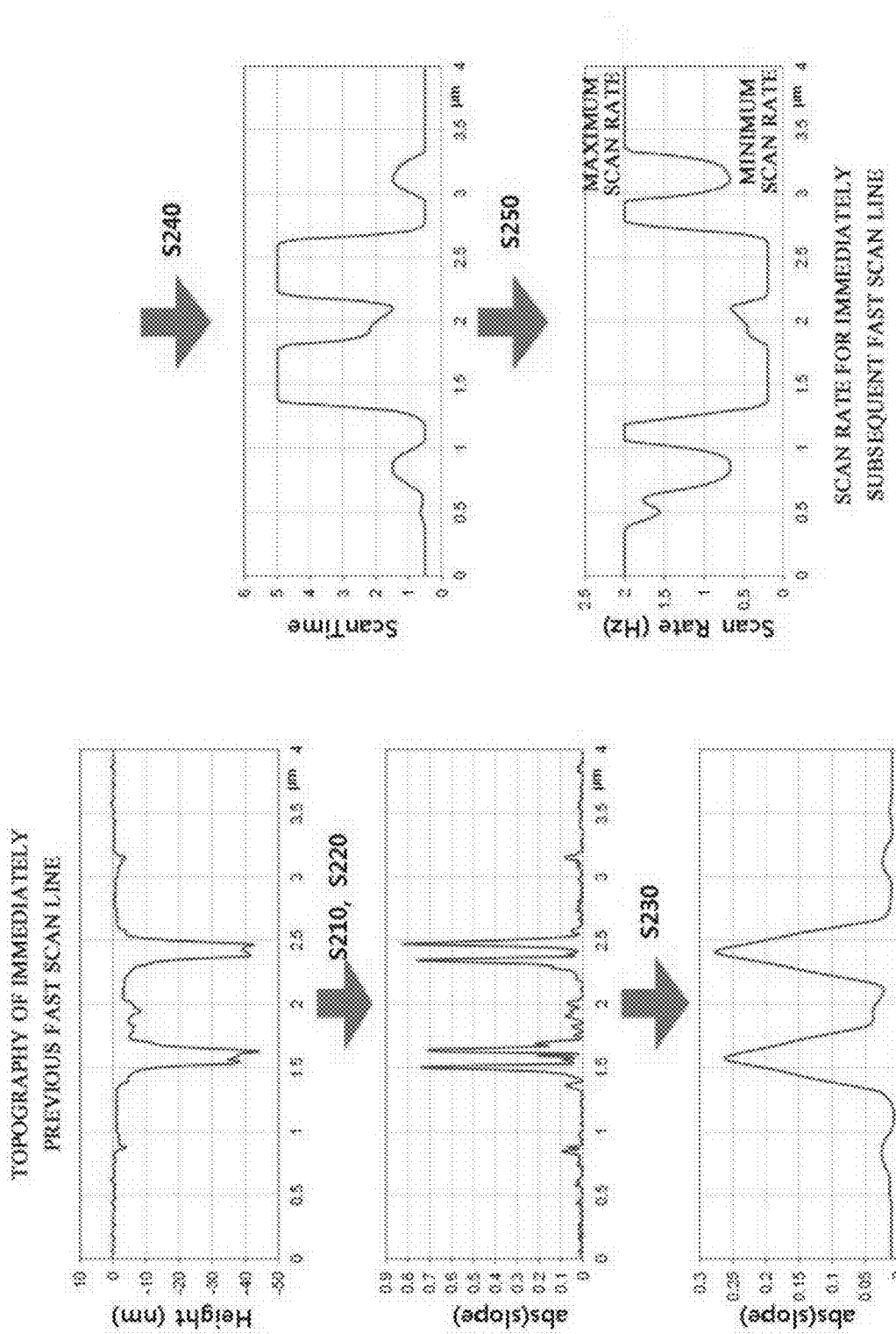
FIG. 12 provides graphs illustrating a process for acquiring a scan rate for an immediately subsequent fast scan line.

FIG. 11 illustrates a topographic image and a line profile of an exemplary measurement target, and FIG. 12 provides graphs illustrating a process for acquiring a scan rate for an immediately subsequent fast scan line. Further, FIG. 13 illustrates line profiles measured at a uniform scan rate and a line profile measured at a scan rate acquired by using the method of the present disclosure.

Referring to FIG. 11, an exemplary measurement target is measured in the X-direction as a fast scan direction. All the data illustrated in FIG. 11 are acquired by an XE-series atomic force microscope manufactured by the present applicant.

Based on the above-described "measurement method with adaptive scan rate", a scan rate for an immediately subsequent fast scan line is obtained. The data acquired after the respective steps are illustrated in FIG. 12. The detailed calculation principle is as described above.

Figure 13:
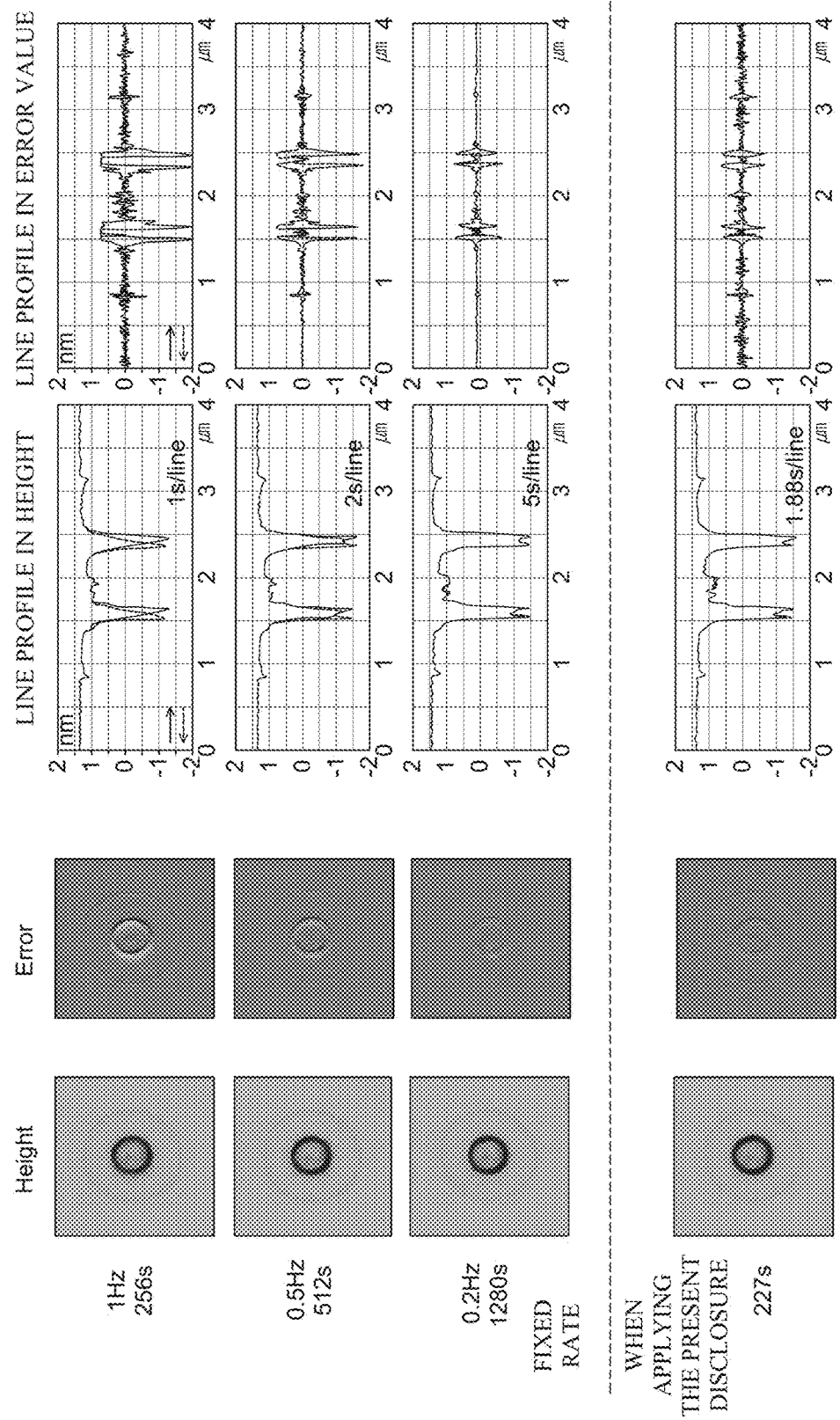
FIG. 13 compares line profiles measured at a uniform scan rate with a line profile measured at a scan rate acquired by using the method of the present disclosure.

Referring to FIG. 13, a line profile acquired at a scan rate of 1 Hz in a forward direction (right direction in FIG. 13) is in disagreement with that in a backward direction (left direction in FIG. 13). That is, since the scan rate is too high, feedback is not appropriately offered at a portion having a high variation value. As the scan rate is decreased, the line profile in the forward direction becomes in agreement with the line profile in the backward direction. However, at a scan rate of 0.2 Hz, 1280 seconds is needed to obtain a topographic image as illustrated in FIG. 10 (in the case where it takes 5 seconds to scan a single fast scan line and there are 256 fast scan lines).

On the contrary to this, when a topographic image is obtained by using the method according to the present disclosure, it takes 227 seconds and a line profile having a quality equivalent to that acquired at 0.2 Hz can be acquired. That is, while an image quality is improved, a measurement speed can be significantly reduced. Therefore, it is possible to solve an underlying problem about the throughput of an atomic force microscope.

The configurations of XE-series and NX-series heads and atomic force microscopes manufactured by the present applicant, Park Systems, may be applied as other components than the above-described components, but the present disclosure may not be limited thereto.

Although the exemplary embodiments of the present disclosure have been described with reference to the accompanying drawings, it would be understood by those skilled in the art that various changes and modifications may be made without changing technical conception and essential features of the present disclosure. Thus, it is clear that the above-described embodiments are illustrative in all aspects and do not limit the present disclosure.

What is claimed is:

1. A measurement method in which a sensing unit acquires surface data of a measurement target while scanning the surface of the measurement target, and at least one of the sensing unit and the measurement target is moved in order for the sensing unit to scan the surface along a plurality of fast scan lines on the surface of the measurement target, the measurement method comprising:
    a first step in which the sensing unit scans a surface along any one fast scan line of the plurality of fast scan lines to acquire the surface data along the any one fast scan line; and
    a second step in which the sensing unit acquires a surface data along a fast scan line most adjacent to the any one fast scan line while at least one of the sensing unit and the measurement target is moved along the most adjacent fast scan line, after the first step,
    wherein a scan rate in the second step is determined by using at least the surface data acquired in the first step, and wherein in the second step, the scan rate is determined by using a variation per scan distance in the surface data along the any one fast scan line,
    wherein the scan rate in the second step is set to decrease from a predetermined time before measurement of a point corresponding to a point at which the variation acquired in the first step is equal to or higher than a predetermined value, and/or wherein the scan rate in the second step is set to increase from a predetermined time after measurement of a point corresponding to a point at which the variation acquired in the first step is equal to or lower than a predetermined value.

2. The measurement method according to claim 1, wherein the sensing unit is a cantilever including a tip.

3. The measurement method according to claim 1, wherein the surface data is a topography data about the surface.

4. The measurement method according to claim 1, wherein the method for determining the scan rate in the second step includes:
    acquiring a variation value in the surface data acquired in the first step;
    acquiring an absolute value of the variation value;
    smoothing the absolutized variation value; and
    converting the value acquired by the smoothing into a scan rate.

5. The measurement method according to claim 1, wherein the method for determining the scan rate in the second step includes:
    acquiring a variation value in the surface data acquired in the first step;
    acquiring an absolute value of the variation value;
    smoothing the absolutized variation value;
    clipping the value acquired by the smoothing; and
    converting the value acquired by the clipping into a scan rate.

6. The measurement method according to claim 1, wherein the method for determining the scan rate in the second step includes:
    acquiring a variation value in the surface data acquired in the first step;
    acquiring an absolute value of the variation value;
    clipping the absolutized variation value;

smoothing the value acquired by the clipping; and
converting the value acquired by the smoothing into a scan rate.

7. The measurement method according to claim 1, wherein the method for determining the scan rate in the second step includes:
smoothing the surface data acquired in the first step; and
converting a value acquired by the smoothing into a scan rate.

8. The measurement method according to claim 1, wherein the method for determining the scan rate in the second step includes:
smoothing the surface data acquired in the first step;
clipping a value acquired by the smoothing; and
converting a value acquired by the clipping into a scan rate.

9. The measurement method according to claim 1, wherein the method for determining the scan rate in the second step includes:
clipping the surface data acquired in the first step;
smoothing a value acquired by the clipping; and
converting a value acquired by the smoothing into a scan rate.

10. The measurement method according to claim 4, wherein the smoothing is performed by using a low-pass filtering technique.

11. The measurement method according to claim 5, wherein the smoothing is performed by using a low-pass filtering technique.

12. The measurement method according to claim 6, wherein the smoothing is performed by using a low-pass filtering technique.

13. The measurement method according to claim 7, wherein the smoothing is performed by using a low-pass filtering technique.

14. The measurement method according to claim 8, wherein the smoothing is performed by using a low-pass filtering technique.

15. The measurement method according to claim 9, wherein the smoothing is performed by using a low-pass filtering technique.

16. A measurement apparatus in which a sensing unit scans a surface of a measurement target and acquires a surface data, the measurement apparatus comprising:
an XY-scanner configured to generate a relative movement between the measurement target and the sensing unit in an XY-direction;
a Z-scanner configured to generate a relative movement between the measurement target and the sensing unit in a Z-direction; and
a control device configured to control driving of the XY-scanner and the Z-scanner,
wherein the control device drives the XY-scanner such that the sensing unit scans along M number of fast scan lines on the surface (herein, M is an integer of 2 or more),
the control device determines a scan rate for an Nth fast scan line (herein, N is an integer satisfying $1<N\leq M$) by using surface data of at least N−1th measured fast scan line, and drives the XY-scanner accordingly,
the control device determines the scan rate for the Nth fast scan line by using a variation per scan distance in the surface data of N−1th measured fast scan line,
wherein the control device controls that the scan rate for the Nth fast scan line is set to decrease from a predetermined time before measurement of a point corresponding to a point at which the variation acquired in N−1th fast scan line is equal to or higher than a predetermined value, and/or wherein the control device controls that the scan rate for the Nth fast scan line is set to increase from a predetermined time after measurement of a point corresponding to a point at which the variation acquired in N−1th fast scan line is equal to or lower than a predetermined value.

17. The measurement apparatus according to claim 16, wherein the XY-scanner and the Z-scanner are formed into one body.

18. The measurement apparatus according to claim 16, wherein the measurement apparatus is an atomic force microscope.

* * * * *